United States Patent [19]

Hill

[11] 4,311,540

[45] Jan. 19, 1982

[54] ULTRASONIC BONDING PROCESS

[75] Inventor: Berlie R. Hill, Cana, Va.

[73] Assignee: Burlington Industries, Inc., Greensboro, N.C.

[21] Appl. No.: 145,833

[22] Filed: May 1, 1980

Related U.S. Application Data

[63] Continuation-in-part of Ser. No. 938,647, Aug. 31, 1978, Pat. No. 4,259,399.

[51] Int. Cl.³ .............................................. B32B 31/16
[52] U.S. Cl. ................................. 156/73.1; 156/580.1; 156/580.2
[58] Field of Search ................. 156/73.1, 580.1, 580.2

[56] References Cited

U.S. PATENT DOCUMENTS

| | | | |
|---|---|---|---|
| 3,113,225 | 12/1963 | Kleesattel et al. | 310/26 |
| 3,575,752 | 4/1971 | Carpenter | 156/73.1 |
| 3,733,238 | 5/1973 | Long et al. | 156/580.1 |
| 3,736,209 | 5/1973 | Carpenter | 156/73.1 |
| 3,817,802 | 6/1974 | Meyer | 156/73.1 |
| 3,939,033 | 2/1976 | Grgach et al. | 156/515 |
| 3,949,127 | 4/1976 | Ostermeier | 428/296 |
| 4,086,112 | 4/1978 | Porter | 156/73.1 |
| 4,146,416 | 3/1979 | Goldman | 156/73.1 |

FOREIGN PATENT DOCUMENTS 2259203 6/1974 Fed. Rep. of Germany .
2285975 4/1976 France .

Primary Examiner—James J. Bell
Attorney, Agent, or Firm—Cushman, Darby & Cushman

[57] ABSTRACT

A method and apparatus are provided for the bonding of web fibers together ultrasonically. A patterned roll anvil, or the equivalent, and a horn of an ultrasonic welding machine are constructed especially for producing a nonwoven fabric from a batt of random loose ultrasonically fusible fibers. The patterned roll anvil has raised portions formed thereon spaced from each other in a direction perpendicular to the axis of rotation of the roller a distance A. The horn face is constructed so that when disposed in operative association with the anvil roller parallel to the axis of rotation of the roller, the horn face has a dimension X perpendicular to the axis of rotation of the roller that is less than 2A. In forming fabric from batts having a weight 3 ounces per square yard or less, a carrier of flexible sheet material, such as tissue paper, is passed with the batt in face to face abutting relationship, between the horn and anvil while continuously supplying ultrasonic energy to the batt with the machine sufficient to form the batt into a nonwoven fabric.

37 Claims, 10 Drawing Figures

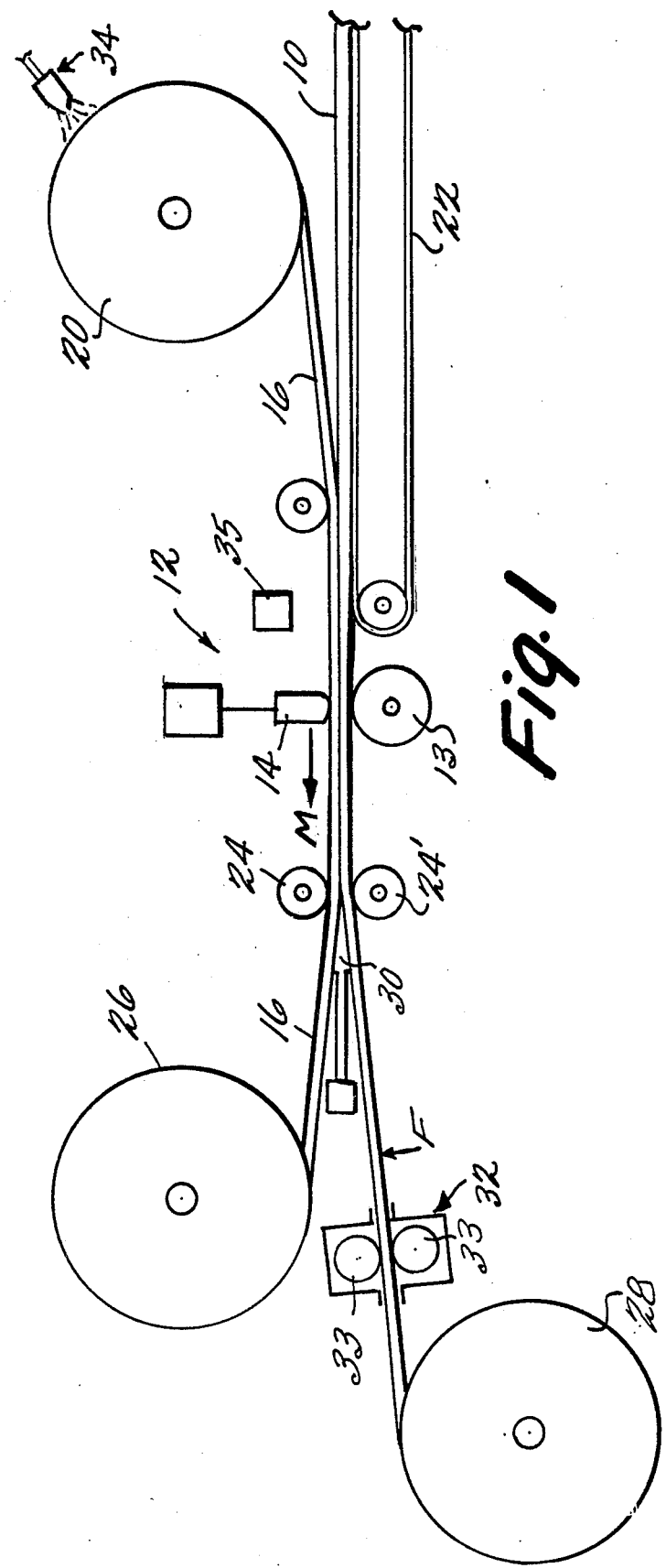
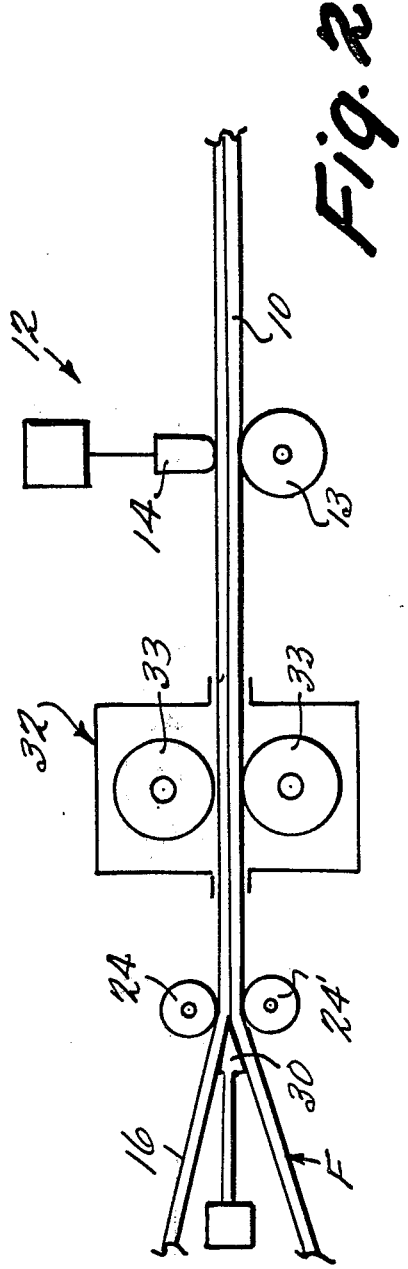
Fig. 1
Fig. 2

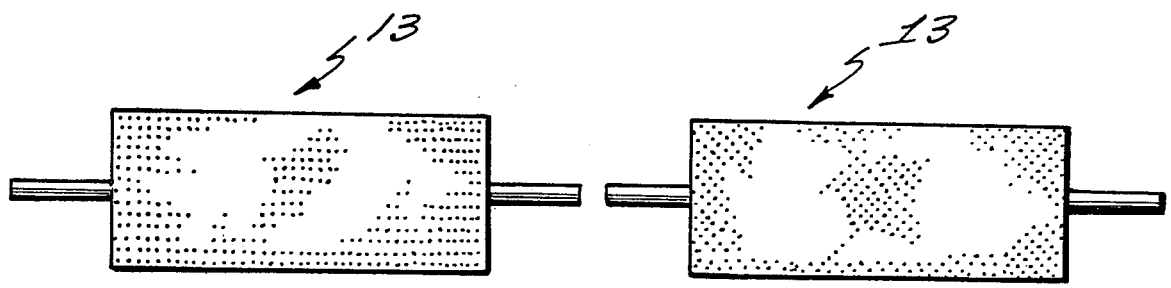
Fig. 3a    Fig. 3b
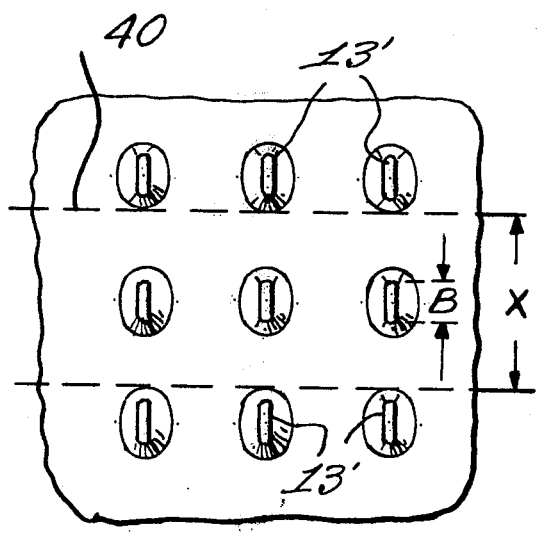    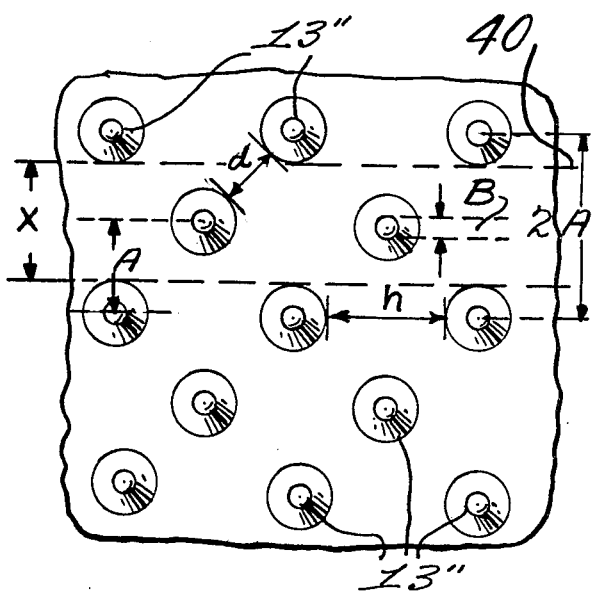
Fig. 4a    Fig. 4b

ULTRASONIC BONDING PROCESS

CROSS REFERENCE TO RELATED APPLICATIONS

This application is a continuation in part of application Ser. No. 938,647 filed Aug. 31, 1978 now U.S. Pat. No. 4,259,399 (the disclosure of which is hereby incorporated by reference herein).

BACKGROUND AND SUMMARY OF THE INVENTION

Prior art techniques for forming nonwoven fabric from batts of random, loose thermoplastic fibers and the like have encountered one or more of the following drawbacks: Unacceptable fabric properties (especially strength in hand). Slow processing speeds. Equipment malfunction due to burnup of the anvil roller should the batt break or cease to be fed between the horn and roller, or should scrap metal inadvertently appear in the bat. Unacceptable aesthetic characteristics of the fabric, especially surface characteristics. Unacceptable failure rate of ultrasonic horns.

Problems associated with an unacceptably high failure rate of ultrasonic horns have also occurred in the formation of nonwoven fabric from batts having a weight greater than 3 ounces per square yard, and even in the fusing of fibers of a plurality of webs together.

According to the present invention, all the above drawbacks, except for horn failure, are solved utilizing a carrier of flexible sheet material capable of drawing and spreading out ultrasonic energy from the machine, and passing the carrier and lightweight batt together between the horn and anvil of the machine. The use of the carrier unexpectly results in increased fabric strength for lightweight fabrics (i.e. 3 ounces per square yard and less, depending on fiber denier), results in a fabric having smooth surfaces and good textile hand, and thus better aesthetic characteristics, allows a quantum increase in the speed of bonding, and positively prevents damage to the anvil roller even if the batts being fed to the ultrasonic machine should break or scrap metal should inadvertently become associated therewith.

The unacceptably high horn failure rate can also be remedied according to the present invention by constructing the horn face in a particular manner vis-a-vis the patterned roll anvil. When ultrasonic horns having horn faces with a width greater than twice the spacing between the raised surface portions of the roller anvil in a dimension perpendicular to the axis of rotation of the anvil roller are utilized, a high failure rate of horns results. Such horns have substantially even amplitude along the entire extent thereof (e.g. 3.6–4 mils). It has been found according to the present invention, however, that by providing a horn face having a dimension perpendicular to the axis of rotation of the anvil roller less than twice the spacing between raised portions in that dimension, problems of unacceptable of horn failure are eliminated, and a product having enhanced smoothness results. Such horns with relatively thin faces (e.g. 1/10 inch) have significant (e.g. greater than 1 mil) amplitude variation over the length thereof (e.g. 2.6 mils at the ends and 4 mils at the middle).

It is the primary object of the present invention to produce fabrics utilizing ultrasonic bonding with increased process efficiency, especially to produce lightweight nonwoven fabrics from lightweight fiber batts. This and other objects of the invention will become clear from an inspection the detailed description of the invention from the appended claims.

DESCRIPTION OF THE DRAWINGS

FIG. 1 is a schematic view illustrating an exemplary process of practicing the present invention, providing the carrier against the ultrasonic horn;

FIG. 2 is a detailed schematic alternative embodiment to FIG. 1, wherein heat transfer print paper is provided instead of the carrier;

FIGS. 3a and 3b are frontal detailed surface views, respectively, of an exemplary patterned roll anvil utilizable for practicing the present invention;

FIGS. 4a and 4b are frontal detailed surface views, respectively, of another patterned roll anvil suitable for practicing the present invention, shown in conjunction with a horn (in dotted line);

DETAILED DESCRIPTION OF THE DRAWINGS

Figure 5:
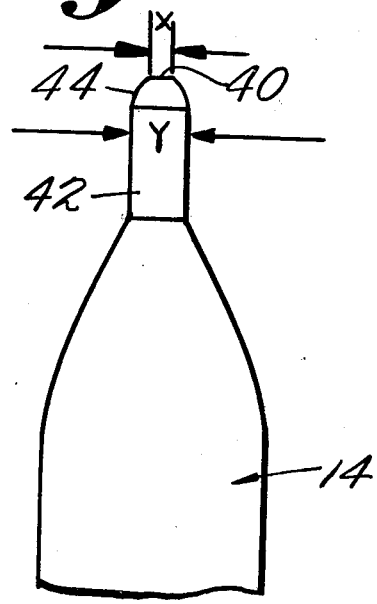
FIG. 5 is a schematic end view of an exemplary ultrasonic horn according to the present invention.

FIGS. 1 and 2 show exemplary apparatus for practicing methods according to the present invention, resulting in the formation of a nonwoven fabric F from a lightweight batt 10 of random, loose, ultrasonically fusible fibers utilizing an ultrasonic welding machine 12 having a patterned roll anvil 13 (or the equivalent) and a horn 14, and a carrier 16 of flexible sheet material capable of drawing and spreding out ultrasonic energy from the machine 12. The term "lightweight" as used in the present specification and claims, when describing the fiber batts or nonwoven fabrics produced, means batts or fabrics having a weight of about 3 oz./yd.$^2$ or less depending upon denier. However, it is to be understood that the fiber batt and fabric weights for which the advantageous unexpected results according to the invention are significant are not capable of exact definition because the fabric weights are dependent upon the fiber denier. For fibers having a count of 3 denier, the use of carrier 16 results in significant advantage over the prior art for fabrics of 3 oz./yd.$^2$ or less, and particularly for fabrics 2 oz./yd.$^2$ or less; however, for fibers having a count of less than 3 denier, the significant fabric weights will tend to decrease, and for fibers having a count higher than 3 denier, the significant weights will tend to increase.

The ultrasonic welding machine 12 may be selected from a wide variety of commercially available ultrasonic welding machines. Where fabrics of increased width are to be formed, a single elongated roller 13 preferably is provided as the anvil, and a plurality of elongated horns 14 of successive machines are arranged in staggered position across the width of the fabric. The horn may be in the form of a bar, as illustrated in the drawings, or may be in the form of a roll or other conventional form. The anvil has associated therewith a patterned surface means for effecting suitable bonding of the fibers in the batt 10 when brought into contact therewith. The patterned surface means preferably takes the form of a patterned surface of the roll 13 itself, as shown in the drawings. A preferred horn 14 according to the present invention is illustrated in FIGS. 5-8.

The roll 13, as shown most clearly in FIGS. 3 and 4, has a patterned configuration with an optimum number and size of upstanding points 13', 13", for fabric strength and hand. If the points 13', 13" are too large, the resulting fabric will be weakened and have an unacceptable appearance and hand, and if the points are too small, the fabric again will be weakened.

Both of the rollers in FIGS. 3 and 4 have points 13', 13", respectively, that have a tip area of about 0.003 sq. in., which has been found to be the optimum area for effecting proper bonding with good hand for lightweight fabrics. In the FIG. 3 embodiment, the points 13' have a distal surface area with an oblong shape (see FIG. 3b), being long in the machine direction (along the circumference of the roll) and narrow in the cross-machine direction (along the length of the roll), and the points are disposed in regular columns and rows, the columns extending around the circumference of the roller 13 and disposed in a plane generally perpendicular to the axis of rotation of the roller 13, and the rows extending along the length of the roller 13, generally parallel to the axis of rotation of the roller 13. The points 13" of the roller 13 shown in FIG. 4 are truncated cones, having a circular tip (distal surface area) of about 1/32 in. in radius, with a diagonal distance d between points of about 3/32 in. Alternatively, a corduroy, nonwoven fabric F may be produced by utilizing a roll 13 having a plurality of elongated narrow ridges formed along the length thereof, and spaced along the circumference thereof. The raised portions (e.g. tips 13', 13") of the roll pattern are spaced from each other along the circumference of the roll 13 (in the direction of Feed M) a distance A (see FIGS. 4a and 4b).

The lightweight fiber batt 10 preferably is a batt of thermoplastic fibers, such as polyester, and the batt need not be needled before formation into the nonwoven fabric F. To provide added strength Heterofil, Cambrelle, or like bicomponent sheet and core filament fibers may be utilized. Typical blanes eminently suitable for the lightweight batt 10 include 25% Heterofil, 75% polyester; and 50% Heterofil, 50% polyester.

The carrier sheet 16 may be selected from a variety of flexible, smooth-surfaced sheet materials capable of drawing and spreading out ultrasonic energy from the machine. Not all flexible sheet materials have this capability; however, tissue paper, Nomex, brown paper, rayon, and many other nonthermoplastic sheets do have this characteristic. All these specified flexible sheet materials inherently are incapable of printing or dyeing the batt 10, and produce an unprinted and undyed fabric F (unprinted or undyed by the carrier 16, that is). The carrier 16 must be one that may be readily separated from the nonwoven fabric F formed.

In FIG. 1, exemplary apparatus is provided for formation of a lightweight nonwoven fabric F from a lightweight fiber batt 10 on a relatively high speed, commercial scale. The apparatus includes a roll 20 of carrier sheet 16, and a conveyor 22 for feeding the carrier 16 and batt 10, respectively to the machine 12. The batt 10 will normally not have sufficient strength to be transported to the machine 12 directly from a roll, therefore a conveyor 22 or the like is preferred. After treatment in the machine 12, the carrier 16 and formed nonwoven fabric F move between direction changing rolls 24, 24' and are fed to driven takeup rolls 26, 28, respectively. Preferably, some sort of separating structure 30 is provided between the carrier 16 and fabric F after the rolls 24, 24', to facilitate separation when separation may prove a problem. Because the fabric F is lightweight too large of a tension force cannot be supplied by roller 28 or the like, otherwise fabric damage may result. The means 30 may comprise a knife blade, plurality of air jets, or like structure capable of facilitating separation with adverse effect on the fabric properties. Depending on the nature of the carrier 16, after collection of the roll 26, it may be reused for forming further fabric F, or may be put to another productive use.

In order to enhance the strength properties of the formed fabric F, it is preferred that the fabric F be heat set utilizing conventional heat setting apparatus shown diagrammatically at 32, including sets of heated rolls 33. Depending upon the nature of the carrier 16, and the formed fabric F, the heat setting may take place after separation of the carrier 16 and fabric F (as in FIG. 1), or before separation (as in FIG. 2).

The apparatus of FIG. 2 may be used when heat transfer print paper is used instead of carrier 16.

A spray with release agent on carrier 16 (see apparatus 34 in FIG. 1) prior to disposition in engagement with the batt 10 may be provided.

Decorative fabrics can be produced by disposing contrasting fibers on the batt 10 before being fed to the machine 12, such as by utilizing a yarn control feed device shown schematically at 35 in FIG. 1. The structure 35 disposes contrasting fibers in a pattern, or randomly, on the batt 10, such as dyed acrylic fibers. The added fibers become part of the nonwoven fabric F produced.

By utilizing the carrier 16 it is possible to significantly increase the strength, desirable textile hand, and desirable appearance characteristics of the lightweight formed fabric F, and to very significantly increase the speed with which the fabric F can be formed. Additionally, the carrier 16 acts as a barrier between the horn 14 and patterned roll 13 so that even should the batts 10 break or should scrap metal be disposed within the batt, the horn will not burn the roller out (as would be the case without the carrier 16). The improved characteristics of the lightweight formed fabric, and improved efficiency of the method operation are best seen from the following table:

TABLE

| Carrier | Batt Weight (oz./yd.$^2$) | Fabric Thickness (inches) | Break Strength (lbs.) | Elongation (%) | Appearance | Process Speed (yd./min. max.) |
|---|---|---|---|---|---|---|
| none | 2.81 | .032 | 26.1 | 54.8 | poor | 4 |
| against anvil | 2.72 | .026 | 28.5 | 45.5 | good | 6 |
| against horn | 2.71 | .025 | 32.0 | 45.4 | good | 15 |

The table results are all for a batt 10 that is a 50/50 blend of Heterofil and polyester, using tissue paper as the carrier. For even lower weights, the differences in results are even more dramatic, especially in appearance and process speed; in fact batts under about 2 oz/yd.$^2$ are believed incapable of automatic feeding without a carrier. Break strength and elongation properties were improved even more significantly once the lightweight formed fabrics were heat set.

Figure 8:
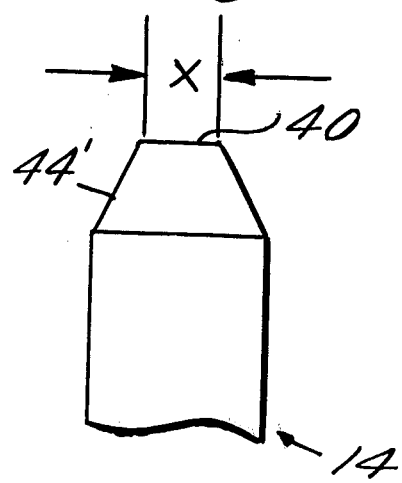
FIG. 8 is a detail schematic end view of a modified form of the horn of FIG. 5.
Figure 6:
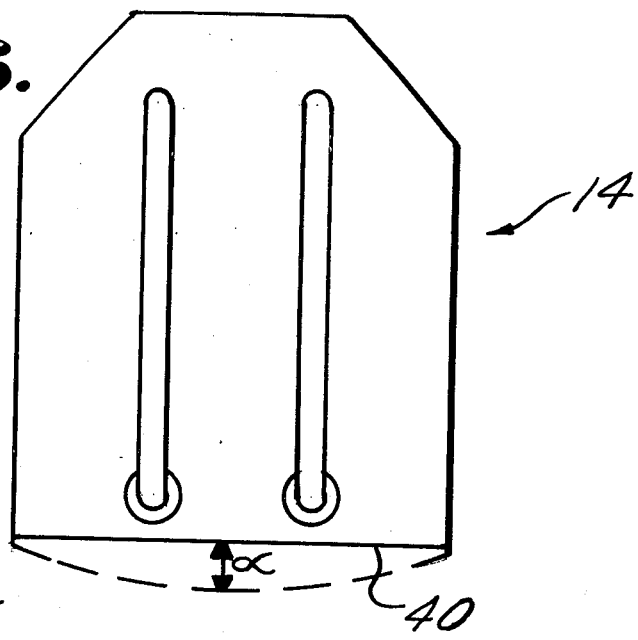
FIG. 6 is a side view of the horn of FIG. 5.
Figure 7:
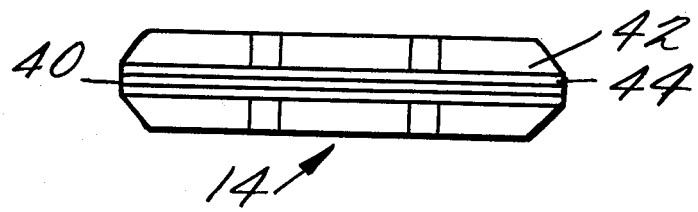
FIG. 7 is a bottom plan view of the horn of FIG. 5.

An exemplary horn 14 according to the present invention is illustrated in FIGS. 5-7, and a modification thereof in FIG. 8. The FIG. 6 view is a ½ scale view of an actual horn and may be utilized in practicing the invention. The horn 14 may be utilized with any conventional power supply, such as one available from Cavitron, Inc.

The horn 14 includes a horn face 40, a horn body 42, and a tapered area 44 between the face 40 and the body 42. A tapered area 44 is illustrated in FIG. 5 as arcuate. In the modification illustrated in FIG. 8, the tapered area 44' is flat. Preferably horn face 40 is flat, as illustrated in the drawings.

Utilizing horns, in practicing the method described with respect to FIG. 1, that have a horn face 40 with a width X greater than 2A (see FIGS. 4a and 4b in particular), such as ⅜ inch according to the scale illustrated in the drawings, an unacceptably high failure rate of the horns is provided, and the amplitude $\alpha$ of horn vibration is substantially constant along the entire length of the face 40 (i.e. 3.6-4.0 mils). According to the present invention, it has been found that if the amplitude $\alpha$ (see FIG. 6) is uneven across the length of the horn face (e.g. 2.6-4.0 mils), the unacceptable horn failure rate does not occur. Also, the qualities of the fabric F produced are improved. It is believed that there is a cause and effect relationship between the uneven amplitude and the width X of the horn face 40.

According to the present invention, the dimension X of the horn face 40 parallel to the direction of feed M of the batt 10, and perpendicular to the axis of rotation of the anvil roller 13, is chosen, so that it is less than 2A (see FIGS. 4a and 4b in particular). Effective results may be obtained if the width X is even as small as to be effectively equal to the dimension B of the contact points 13', 13" along the direction of feed M of the batt 10 (perpendicular to the axis of rotation of roller 13). Utilizable with the anvil roller 13 illustrated in FIG. 4b, the dimension X would typically be about 1/10 inch (or could be less), with Y=about ⅜ inch (see FIG. 5).

In comparative tests run utilizing a horn 14 as illustrated in FIGS. 5-7, but having a dimension X of about ⅜ inch, with a patterned anvil roller as illustrated in FIGS. 3b and 4b, all three horns 14 used cracked after a very short running time (e.g. about 20 minutes). However, a horn according to the present invention, with a dimension X of about 1/10 inch, was run for at least 40 hours without cracking.

The horns 14 may be staggered across the width of the roller 13, with edges overlapping, generally as illustrated in U.S. Pat. No. 3,733,238, or may have the edge configurations thereof contoured to provide an overlap, such as illustrated in U.S. Pat. No. 4,146,416.

While the utilization of the horn 14 according to the present invention has been described with respect to the formation of nonwoven fabric from a batt of random, loose ultrasonically fusible fibers, it is equally applicable to the welding of fibers from two or more webs together. When a horn 14 according to the present invention, with uneven amplitude along the length thereof, is utilized with either lightweight or heavyweight (3 ozs./yd.$^2$ or more, depending upon denier) batts, the final fabric F is improved, having a smoother more uniform texture.

When constructing horns 14 according to the present invention, it may be possible to form the horns out of steel instead of titanium since uniform amplitude on the order of 3.6-4 mils is not required according to the present invention, and the amplitude can be less than the previously supposed minimum of 3.6 mils. Horns 14 of steel would, of course, be much less expensive, and could have other desirable properties with respect to ease of manufacture, etcetera.

While the invention has been here and shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all the equivalent methods and assemblies.

What is claimed is:

1. A method of forming a nonwoven fabric from a batt of random, loose ultrasonically fusible fibers utilizing an ultrasonic welding machine having a horn, anvil, and patterned surface means associated with the anvil, said method comprising the steps of:
   progressively feeding in a given direction, the batt between the horn and patterned surface means associated with the anvil of the machine;
   forming the patterned surface means associated with the anvil so that raised portions of said patterned surface means are spaced a distance A in the dimension of feeding of the batt;
   disposing said horn in operative relationship with said anvil patterned surface means so that said horn is substantially perpendicular to the direction of feeding of said batt; and
   providing said horn with a horn face having an effective distance X along the dimension of feeding of the batt which is less than about 2A.

2. A method as recited in claim 1 wherein said step of providing said anvil patterned surface means is practiced by providing a plurality of spaced points, said points having a distance B along the dimension of feeding of the batt wherein B is less than A; and wherein said horn face providing step is accomplished by constructing said horn face so that X is greater than or equal to B.

3. A method as recited in claim 2 wherein said horn face providing step is practiced so that X is approximately equal to B.

4. A method as recited in claim 1 or 3 wherein said patterned surface means providing step is accomplished by providing said anvil as a roller having a patterned surface.

5. A method as recited in claims 1 or 3 wherein said batt has a weight of about 3 ounces per square yard or less, and further comprising the step of progressively feeding the batt and a carrier capable of drawing and spreading out ultrasonic energy from the machine, together between the horn and patterned surface means associated with the anvil of the machine.

6. A method as recited in claim 5 wherein said carrier is incapable of printing or dyeing the batt, and comprising the further step of separating the carrier from the formed nonwoven fabric after passage thereof between the horn patterned surface means associated with the anvil, and unprinted and undyed nonwoven fabric being produced.

7. A method of forming a non-woven fabric having a weight of about 3 oz./yd.$^2$ or less from a batt of random, loose ultrasonically fusible fibers, the batt having a weight of about 3 oz./yd.$^2$ or less, utilizing an ultrasonic welding machine having a horn, anvil, and patterned surface means associated with the anvil, and a carrier of flexible sheet material, said carrier being capable of drawing and spreading out ultrasonic energy from the machine but being incapable of printing or dyeing the batt, said method comprising the steps of:

disposing the batt and the carrier in face-to-face abutting relationshiop, progressively feeding the batt and carrier together between the horn and patterned surface means associated with the anvil of the machine, supplying ultrasonic energy to the batt with the machine sufficient to form the batt into a nonwoven fabric, and separating the carrier from the formed nonwoven fabric after passage between the horn and patterned surface means associated with the anvil, a fabric unprinted and undyed by the carrier being produced.

8. A method as recited in claim 7 wherein the carrier is disposed against the horn and the batt is disposed against the patterned surface means associated with the anvil during progressive feeding thereof.

9. A method as recited in claim 7 wherein the carrier is disposed against the patterned surface means associated with the anvil and the batt is disposed against the horn.

10. A method as recited in claim 7 wherein the carrier is heat transfer print paper, and comprising the further step of heat setting the formed nonwoven fabric before separation of the heat transfer print paper from the formed nonwoven fabric.

11. A method as recited in claim 7 comprising the further step of heat setting the formed nonwoven fabric after separation thereof from the carrier.

12. A method as recited in claim 7 wherein the carrier is selected from the group consisting essentially of brown paper, tissue paper, and rayon.

13. A method as recited in claim 7 wherein the carrier is selected from the group consisting essentially of non-thermoplastic flexible sheet materials capable of drawing and spreading out ultrasonic energy from the machine, and protecting the machine should scrap metal or the like appear in the batt; and Nonmex.

14. A method as recited in claim 7 wherein the batt has an initial weight of 12 oz./yd.$^2$ or less.

15. A method as recited in claim 7 wherein the batt fibers are selected from the group consisting of entirely polyester; and a blend of sheath/core bicomponent filaments, and polyester.

16. A method as recited in claim 7 comprising the further step of disposing contrasting fibers on the batt prior to feeding through the machine.

17. A method as recited in claim 7 wherein the patterned surface means associated with the anvil comprises a patterned surface of the anvil having upstanding contact points of about 0.003 in.$^2$ in area.

18. A method of forming a nonwoven fabric from a batt of random, loose ultrasonically fusible fibers utilizing an ultrasonic welding machine having a horn with a horn face, anvil, and patterned surface means associated with the anvil, said method comprising the steps of:

(a) continuously feeding, in a given direction, the batt between the horn and the patterned surface means associated with the anvil of the machine;

(b) disposing said horn in operative relationship with said anvil patterned surface means, and defining said horn face, so that said horn is substantially perpendicular to the direction of feeding of said batt and so that the amplitude of said horn face is uneven over the length thereof; and (c) supplying said horn with ultrasonic energy sufficient to effect ultrasonic welding of fibers in said batt to produce a nonwoven fabric.

19. A method as recited in claim 18 comprising the further step of:

forming the the patterned surface means associated with the anvil so that raised portions of said patterned surface means are spaced a distance A in the direction of feeding of the batt; and wherein step (b) is practiced by providing said horn with a horn face extending an effective distance X along to the direction of feeding of the batt which is less than about 2A.

20. A method as recited in claim 18 or 19 wherein said batt has a weight of about 3 ounces per square yard or less, and further comprising the step of progressively feeding the batt and a carrier capable of drawing and spreading out ultrasonic energy from the machine, together between the horn and patterned surface means associated with the anvil of the machine.

21. A method as recited in claim 20 wherein said carrier is incapable of printing or dyeing the batt, and comprising the further step of separating the carrier from the formed nonwoven fabric after passage thereof between the horn patterned surface means associated with the anvil, a nonwoven fabric, not printed or dyed by the carrier, being produced.

22. An ultrasonic welding assembly comprising:
a horn;
a patterned roll anvil;
the patterned roll anvil having raised portions formed thereon, with the raised portions in the patterns being spaced from each other around the circumference of the roll anvil a circumferential distance A;
said horn comprising a horn body and a horn face, the horn face extending an effective distance X in a dimension perpendicular to the axis of rotation of said anvil roller;
means for mounting said horn so that it is substantially parallel to the axis of rotation of said roll anvil and is in operative relationship with said roll anvil;
said patterned surface roll anvil having a plurality of distinct points, each of said points extending a distance B in a dimension perpendicular to the axis of rotation of said roll anvil; and
wherein said distances A, B, and X satisfy the relationships:
$B < A$
and
$X \geq B$.

23. An assembly as recited in claim 22 wherein said horn face is flat.

24. An assembly as recited in claims 22 or 23 wherein said horn body tapers to said horn face.

25. An assembly as recited in claim 24 wherein said taper of said horn body is arcuate.

26. An assembly as recited in claim 24 wherein said taper of said horn body is flat.

27. An assembly as recited in claim 22 wherein said horn face distance X is about 1/10 inch.

28. An assembly as recited in claim 22 wherein is said horn is constructed of steel.

29. An assembly as recited in claim 22 further comprising means for continuously feeding at least one web of material between said horn and roller in a dimension perpendicular to the axis of rotation of said anvil roller.

30. An assembly as recited in claim 29 wherein said at least one web feeding means comprises means for feeding a batt of random, loose ultrasonically fusible fibers between said horn and anvil.

31. An assembly as recited in claim 30 wherein said feeding means further comprises means for feeding a carrier of flexible sheet material capable of drawing and spreading out ultrasonic energy from the ultrasonic welding machine between said horn and anvil in face to face abutting relationship with said batt of random, loose ultrasoncially fusible fibers, and means for separating the carrier from the batt after passage thereof between the horn and anvil.

32. An assembly are recited in claim 31 wherein said in patterned anvil roller raised portions are disposed in rows and columns.

33. An assembly as recited in claim 32 wherein said patterned anvil roller raised areas comprise distinct upstanding points.

34. An assembly as recited in claim 33 wherein said distinct upstanding points have a tip area of about 0.003 square inches, and wherein X=about 1/10 inch.

35. An assembly as recited in claim 22 wherein X is approximately equal to B.

36. An ultrasonic welding assembly comprising: a horn having a horn face, an anvil with raised surface means formed thereon; means for feeding at least one web of material in a given direction between said horn and anvil for bonding of fibers of said at least one web; and means for defining said horn face and for mounting said horn with respect to said anvil so that said horn face extends substantially perpendicular to the direction of movement of said at least one web and so that it has significantly uneven amplitude over the length thereof.

37. An assembly as recited in claim 36 wherein said anvil raised surface means includes raised portions spaced a distance A from each other in the direction of movement of said at least one web, and wherein said means for defining said horn face defines said face so that it extends a distance X along the direction of movement of said at least one web, wherein X is less than 2A.

* * * * *